(12) United States Patent
Oyama (10) Patent No.: US 6,203,123 B1
(45) Date of Patent: Mar. 20, 2001

(54) METHOD OF DETECTING TEMPERATURE OF BRAKE FLUID AND METHOD OF CONTROLLING BRAKE FLUID PRESSURE

(75) Inventor: Hitoshi Oyama, Hyogo (JP)

(73) Assignee: Sumitomo Electric Industries, Ltd., Hyogo (JP)

( * ) Notice: Subject to any disclaimer, the term of this patent is extended or adjusted under 35 U.S.C. 154(b) by 0 days.

(21) Appl. No.: 09/203,329

(22) Filed: Dec. 2, 1998

(30) Foreign Application Priority Data

Dec. 3, 1997 (JP) .................................................. 9-332803

(51) Int. Cl.$^7$ ...................................................... B60T 8/32
(52) U.S. Cl. .................... 303/191; 303/DIG. 1; 303/DIG. 2; 374/100
(58) Field of Search .................... 303/191, 166, 303/10, DIG. 1, DIG. 2, DIG. 3, DIG. 4; 188/1.11 R, 1.11 E; 374/100, 143, 163; 73/708; 702/130, 136

(56) References Cited

U.S. PATENT DOCUMENTS

| 4,881,185 | * | 11/1989 | Murakami et al. | 374/143 |
| 5,153,823 | * | 10/1992 | Ries et al. | 374/143 |
| 5,571,248 | | 11/1996 | Seetharaman et al. | 137/625.65 |
| 5,584,543 | * | 12/1996 | Sawada | 303/191 |
| 6,007,165 | * | 12/1999 | Sato et al. | 303/191 |
| 6,012,783 | * | 1/2000 | Schwarzer et al. | 303/140 |

FOREIGN PATENT DOCUMENTS

| 19513128 | 10/1996 | (DE) . |
| 19604126 | 8/1997 | (DE) . |
| 0535392 | 4/1993 | (EP) . |
| 0698538 | 2/1996 | (EP) . |
| 2294311 | 4/1996 | (GB) . |
| 58105863 | 6/1983 | (JP) . |

OTHER PUBLICATIONS

Texas Instruments, "Low Cost Automotive Pressure Transducer", (1996).

"Pressure Sensor Using Polycrystalline Germanium Films Prepared By Plasma Assisted Chemical Vapor Deposition" by Kiichi Kamimura et al., Department of Electrical Engineering, Shinshu University.

"Sensors Using Strain Gages" by Dr. W.J. Ort, Acta Imeko 1982.

Patent Abstract of Japan, vol. 007, No. 211(M–24), dated Sep. 17, 1983.

* cited by examiner

Primary Examiner—Christopher P. Schwartz
Assistant Examiner—Mariano Sy
(74) Attorney, Agent, or Firm—Greenblum & Bernstein P.L.C.

(57) ABSTRACT

This method minimizes the change in the range of pressure increase and reduction with change in the viscosity of brake fluid due to change in the temperature of brake fluid and a delay in pressure increase and reduction due to change in the brake fluid viscosity. A pressure sensor having a zero-point temperature drift function and a pressure sensor having no such drift function are provided to estimate the brake fluid temperature based on the difference in output between the two pressure sensors. Fluid pressure is controlled according to a control mode corresponding to the fluid viscosity based on the estimated fluid temperature. Specifically, the time during which electromagnetic valves are open is changed, or in the arrangement in which an electromagnetic proportional pressure control valve is used, the current supplied to its electromagnet is changed based on the estimated brake fluid temperature.

6 Claims, 7 Drawing Sheets

PRIOR ART

METHOD OF DETECTING TEMPERATURE OF BRAKE FLUID AND METHOD OF CONTROLLING BRAKE FLUID PRESSURE

BACKGROUND OF THE INVENTION

This invention relates to a method of detecting the temperature of brake fluid which is effective in controlling the brake fluid pressure in an automotive brake using electromagnetic on-off valves or a spool/valve type electromagnetic proportional pressure control valve, and a method of controlling the brake fluid pressure which makes it possible to control the brake fluid pressure to an ideal state while avoiding bad influences due to change in the viscosity of the brake fluid with change in the temperature.

Automotive brake systems are being sophisticated year after year. Recent brake systems include not only ABS's (antilock brake systems) but TCS's (traction control systems) and ASC systems (active safety control systems for correcting oversteering or understeering while the vehicle is turning by individually controlling the wheel brakes).

Figure 3:
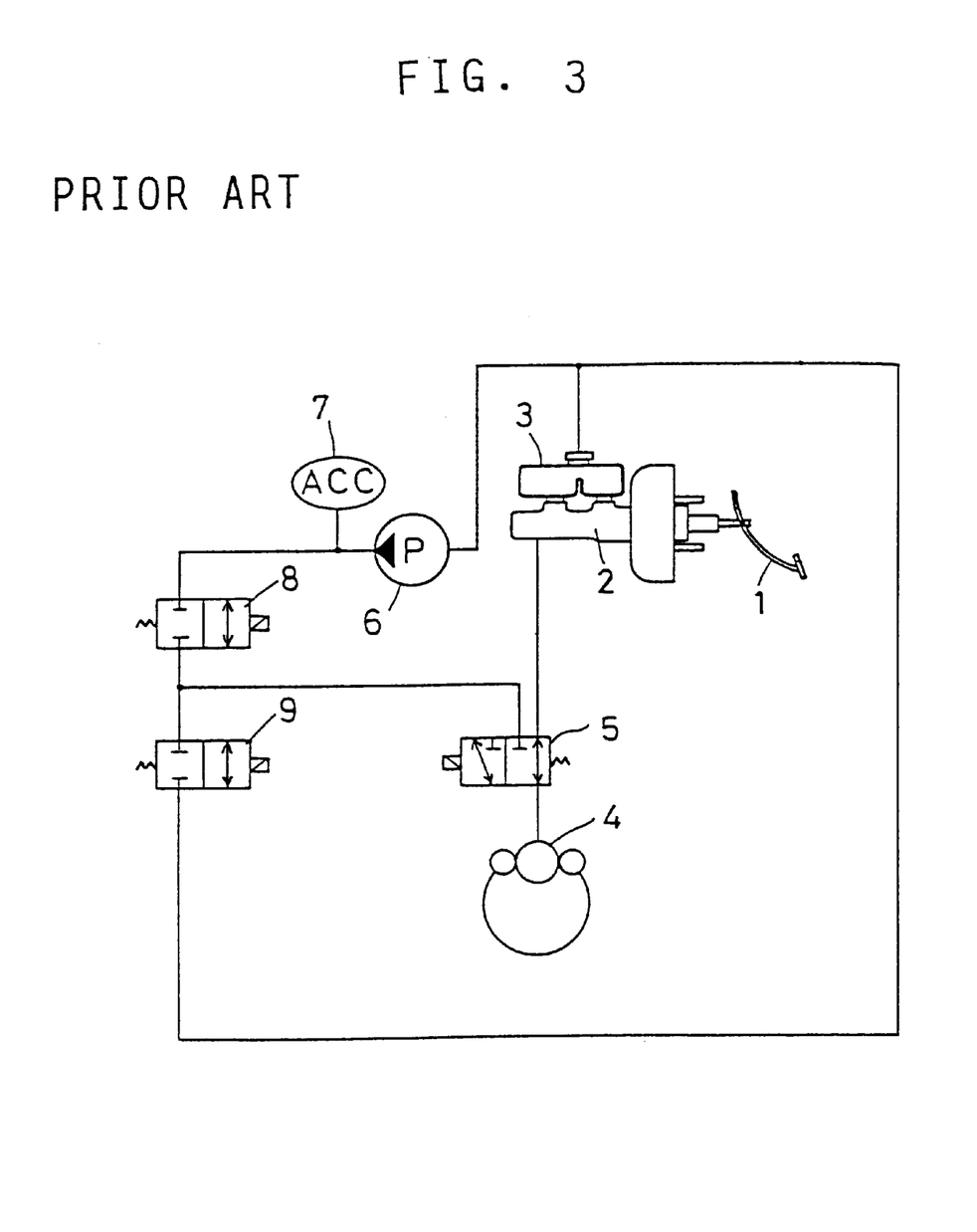
FIG. 3 is a circuit diagram of a conventional brake system in which fluid pressure is controlled by electromagnetic on-off valves.

Such a brake system is shown in FIG. 3. In this system, during normal braking, the fluid passage connecting a master cylinder 2 to a wheel cylinder 4 for producing braking force is open, so that brake fluid can freely flow therebetween.

When a brake pedal is in its ON position, if an electronic control unit (not shown) detects any lockup tendency of the vehicle wheel and produces a pressure reduction signal, the position of an electromagnetic changeover valve 5 changes over to disconnect the wheel cylinder 4 from the master cylinder 2, while an electromagnetic on-off valve 9 opens to discharge fluid pressure from the wheel cylinder 4 into a reservoir 3.

When the locking tendency of the wheel disappears as a result of the pressure reduction, the electronic control unit detects this fact and produces a pressure re-increase signal. In response to this signal, the electromagnetic on-off valves 8 and 9 are opened and closed, respectively, so that fluid pressure is supplied into the wheel cylinder 4 from a pump 6. The wheel cylinder pressure thus rises again. Alternatively, the electromagnetic on-off valves 8, 9 may be both closed to maintain the wheel cylinder pressure. During antilock control, the above operations are repeated until the vehicle comes to a stop or until the brake pedal 1 is released to prevent lockup of the vehicle wheel.

Traction control is similar to antilock control except that the brake pedal 1 is not trodded during traction control. If the electronic control unit detects slip of the vehicle wheel, the electromagnetic changeover valve 5 changes over and the electromagnetic valve 8 opens so that fluid pressure is supplied into the wheel cylinder 4 from an accumulator 7. The wheel cylinder 4 is thus braked in spite of the fact that the brake pedal is not trodden. Then, pressure reduction and pressure re-increase operations are repeated to prevent slip of the vehicle wheel.

Figure 4:
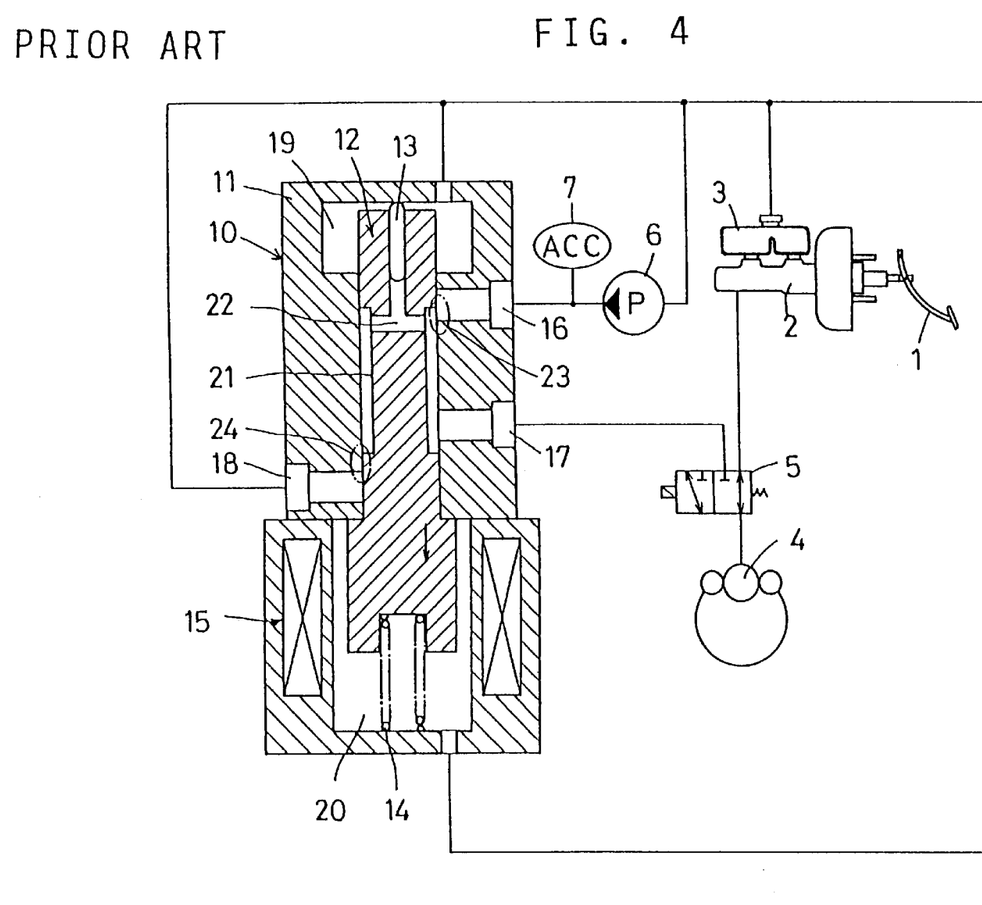
FIG. 4 is a circuit diagram of a conventional brake system in which fluid pressure is controlled by an electromagnetic proportional pressure control valve.

In a different arrangement, an electromagnetic proportional pressure control valve 10 shown in FIG. 4 is used to introduce fluid pressure from the pump circuit into the wheel cylinder 4 and to discharge fluid pressure from the wheel cylinder 4 into the reservoir 3.

This electromagnetic proportional pressure control valve 10 comprises a housing 11, a spool 12 substantially liquid-tightly and slidably inserted in the housing, a reaction pin 13 inserted at one end of the spool 12, a spool-biasing spring 14, and an electromagnet 15 for biasing, i.e. pulling, the spool 12 in the direction opposite to the direction in which the spool is biased by the spring 14.

The housing 11 has a first port 16, a second port 17, a third port 18, a first fluid chamber 19 into which one end of the spool 12 protrudes, and a second fluid chamber 20 into which the other end of the spool 12 protrudes.

The spool 12 has a surface passage 21, and an internal passage 22 kept in communication with the second port 17. The internal passage 22 has one end open to the first fluid passage 19, and at this end, the reaction pin 13 is substantially liquid-tightly inserted in the passage 22. Thus, a difference equal to the sectional area of the reaction pin 13 is created between the areas for bearing fluid pressures that urges the spool 12 in opposite directions. The spool 12 is thus biased under a downward thrust which is equal to the above difference in area multiplied by the pressure at the second port 17.

Between the spool 12 and the first port 16, a first valve portion 23 is formed to open and shut off communication between the first and second ports 16, 17 according to the position of the spool. Between the spool 12 and the third port 18, a second valve portion 24 is formed to open and shut off communication between the second and third ports 17, 18 according to the spool position. The degree of opening of each of the first and second valves 23, 24 changes with the spool position.

With this electromagnetic proportional pressure control valve 10, during a non-control state in which no current is supplied to the electromagnet 15, the spool 12 is maintained in the illustrated position by the spring 14. In this state, the first valve portion 23 is open, so that fluid pressure from the first port 16 flows into the second port 17.

When the electromagnet 15 is energized, the spool 12 is pulled downward in the figure by the electromagnetic force until the upward force balances with the downward force.

The relation at the balancing point is given by the following formula (1). Until the first valve portion 23 closes, the pressure at the second port 17 and the spool moving distance increase as the exciting current I increases. When the current I further increases after the first valve portion 23 has been closed, the second valve portion 24 will open, thus communicating the second port 17 to the third port 18. The pressure at the second port 17 thus drops.

$$Fpr+Fsol=Fsp \tag{1}$$

Fsp: force of the spring 14
Fsol: driving force by the electromagnet 15
Fpr: thrust resulting from fluid pressure
Fpr in the above equation is given by:

$$(P2-P3) \cdot S$$

wherein P2 is the pressure at the second port 17 (load pressure), P3 is the reservoir pressure, and S is the sectional area of the reaction pin 13. On the other hand, Fsol equals b·I2 (b is a constant). Thus, the following relations are met:

$$(P2-P3) \cdot S + b \cdot I2 = Fsp$$

$$\therefore P2=(Fsp-b \cdot I2)/S+P3 \tag{2}$$

Since Fsp, b, S and P3 are all constants, the pressure P2 is proportional to the current I. In the equation (I), (Fsp–Fsol) is the spool driving force by the driving means.

Figure 5:
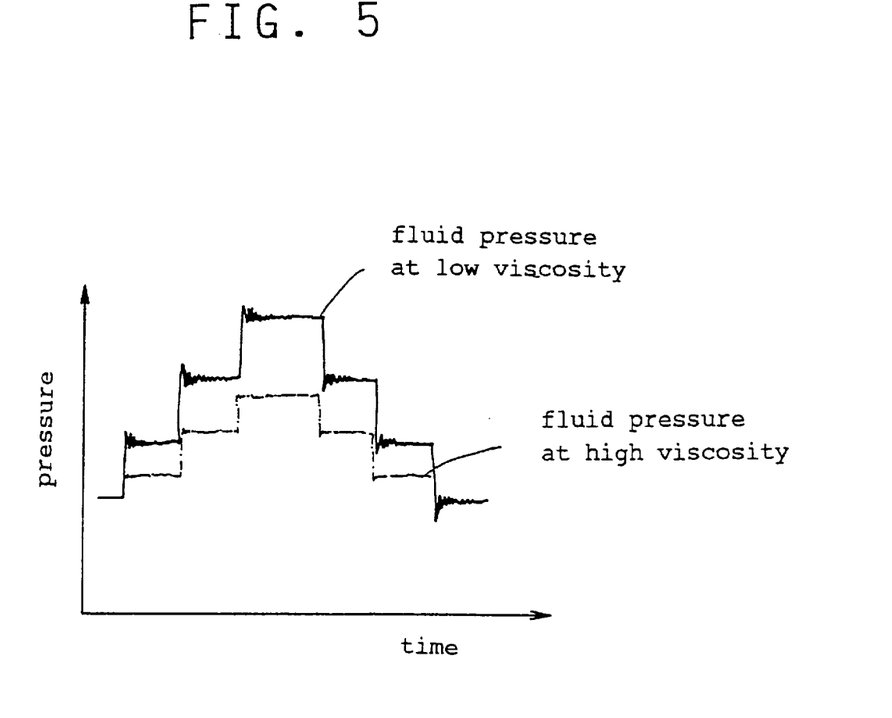
FIG. 5 is a graph showing how the range of pressure increase and reduction changes with change in the fluid viscosity in an arrangement in which electromagnetic on-off valves are used.

In the arrangement in which the electromagnetic on-off valves 8, 9 shown in FIG. 3 are used to introduce fluid pressure from the fluid pressure source (pump) into the wheel cylinder and discharge fluid pressure from the wheel cylinder into the reservoir, if the viscosity of brake fluid changes markedly, while the viscosity is extremely high, brake fluid flows at a slow rate, so that the amount of fluid that passes through the on-off valves decreases. This creates a difference between the pressure range when the fluid viscosity is low (shown by solid line FIG. 5) and the pressure range when it is high (chain line).

Figure 6:
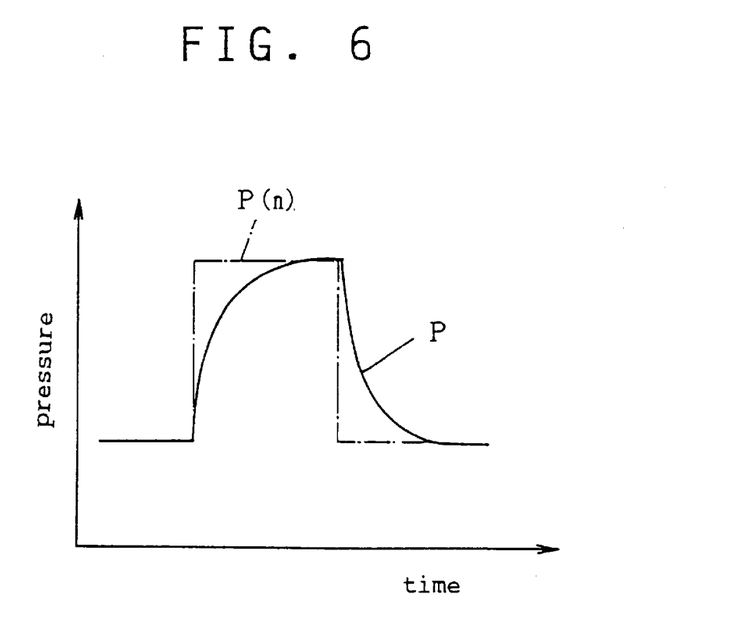
FIG. 6 is a graph showing a fluid pressure waveform when fluid pressure is controlled by an electromagnetic proportional pressure control valve.

In the arrangement in which the spool-valve type electromagnetic proportional pressure control valve shown in FIG. 3 is used to control brake fluid pressure, if the fluid viscosity is extremely high, the actual pressure P rises or falls only slowly as shown in FIG. 6, so that it takes a long time for the actual pressure P to reach the target pressure P(n). This means delay in response.

An object of this invention is to provide a method of detecting a brake fluid temperature as a basic data for control without a temperature sensor and a method of controlling brake fluid pressure which can control fluid pressure based on the detected data so that sufficiently accurate control is possible even if the fluid temperature is low and thus its viscosity is extremely high.

SUMMARY OF THE INVENTION

According to this invention, there is provided a method of detecting brake fluid temperature wherein two pressure sensors are provided for detecting the pressure of a master cylinder in a brake system, one of the pressure sensors has a predetermined zero-point temperature drift function, and the other having no or a minimum amount of zero-point temperature drift, and wherein the temperature of brake fluid with which the pressure sensors are in contact is detected based on a difference in output at zero point between the two pressure sensors.

Figure 7:
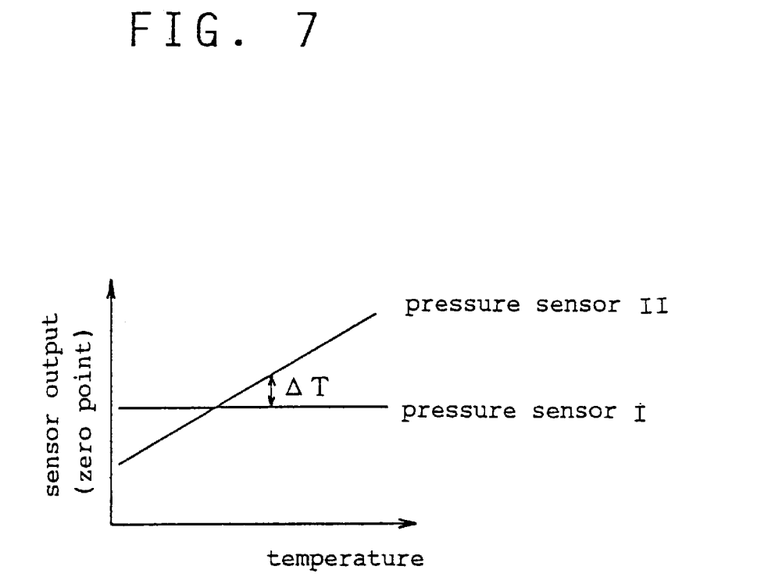
FIG. 7 illustrates the principle of temperature estimation.

The principle of the temperature detecting method according to this invention is shown in FIG. 7, which shows the output characteristics at zero point of a pressure sensor I having a zero-point temperature compensation circuit, and the output characteristics at zero point of a pressure sensor II having a temperature drift function.

Figure 8:
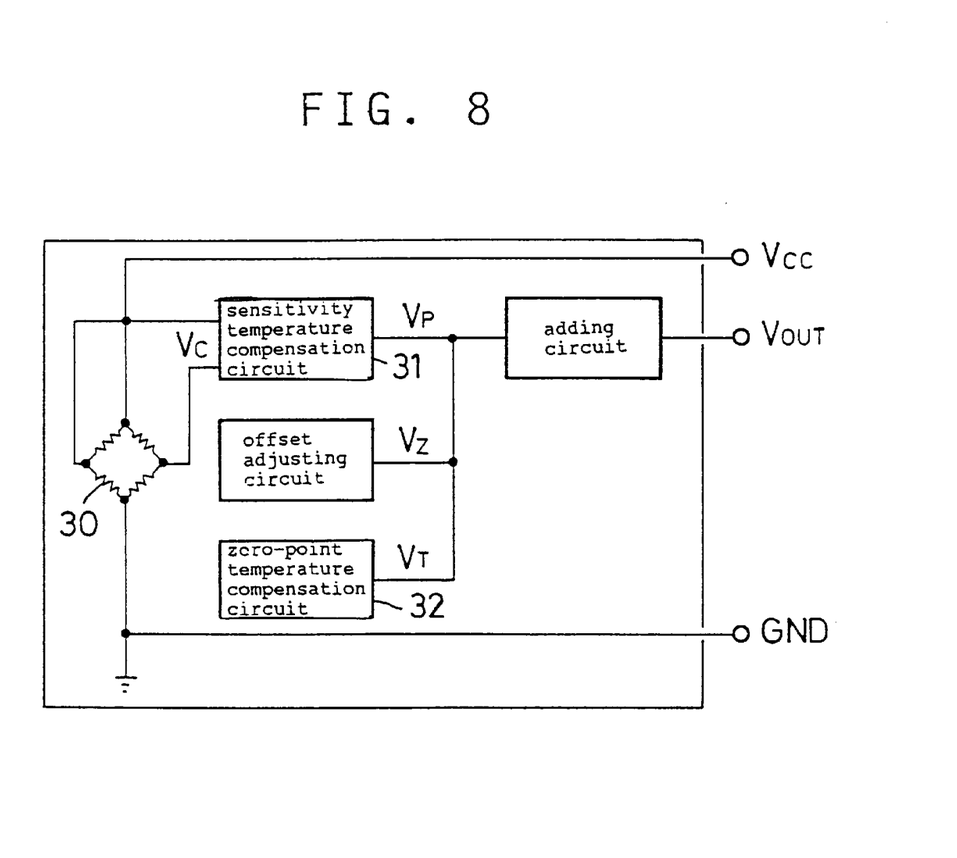
FIG. 8 is a circuit diagram showing the structure of a known pressure sensor.

FIG. 8 shows a known pressure sensor having a zero-point temperature compensation circuit 32 for producing a signal having a waveform completely opposite to a signal waveform at zero-point produced from a sensor element 30 through a sensitivity temperature compensation circuit 31 to keep the output fluctuation to zero. This sensor can be used as the pressure sensor I of FIG. 7. The pressure sensor II of FIG. 7 may be of the type shown in FIG. 8 in which the zero-point temperature compensation circuit 32 is adjusted such that it has a predetermined drift.

In FIG. 7, if the difference in output at zero point between the two pressure sensors I and II is ΔT, it is possible to estimate the temperature of the brake fluid based on the output difference in two pressure sensors because there is a predetermined relationship between the temperature and ΔT. According to this invention, this predetermined relationship is stored in the electronic control unit (not shown) of the brake system, and a circuit (not shown either) for estimating the temperature from the stored relationship and the actual output difference is provided in the ECU.

Similarly, in the arrangement in which a brake sensor and a pressure sensor having a zero-point drift function are used, the pressure sensor output while the brake switch is off, that is, while no master cylinder pressure is being produced, drifts with the temperature. Thus, it is possible to detect the brake fluid temperature based on the zero-point drift output if the relationship between the temperature and the drift output is known beforehand.

A temperature sensor may be provided to measure the brake fluid temperature. But it is economically more advantageous to use a pressure sensor and/or a brake switch which are essential elements of the brake system to estimate the temperature based on the zero-point drift output of the pressure sensor.

Based on the thus estimated brake fluid temperature, it is possible to estimate the viscosity of the brake fluid. According to this invention, the wheel cylinder fluid pressure is controlled by changing over the control mode based on the thus estimated viscosity of the brake fluid to remove any influence due to change in the fluid viscosity. Thus, even if the fluid viscosity becomes extremely high, the brake fluid pressure is controllable with good responsiveness and control accuracy.

Other features and objects of the present invention will become apparent from the following description made with reference to the accompanying drawings, in which:

DETAILED DESCRIPTION OF THE PREFERRED EMBODIMENT

Figure 1:
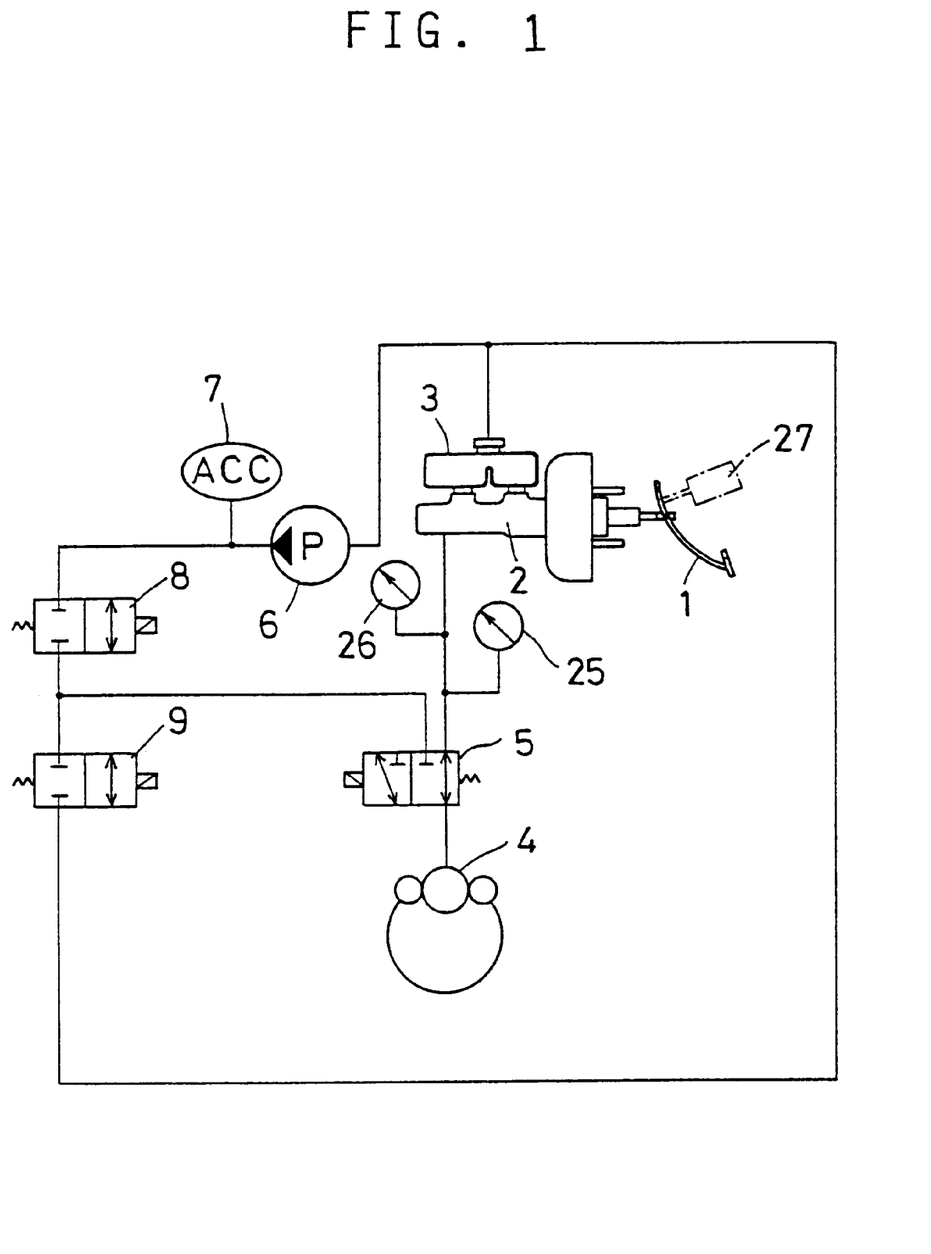
FIG. 1 is a circuit diagram of a brake system constructed by adding means for carrying out the method of this invention to the brake system of FIG. 3.

FIG. 1 shows a brake system to which the method of this invention is applied. This system is constructed by adding means for carrying out the method of this invention to the brake system of FIG. 3.

This brake system comprises a master cylinder 2, a wheel cylinder 4 for producing a braking force by fluid pressure, an electronic control unit (ECU, not shown), and a fluid pressure control unit comprising an electromagnetic changeover valve 5 activated on command of the ECU, electromagnetic on-off valves 8, 9, a pump 6 and an accumulator 7.

In this system, the pressure in the wheel cylinder 4 is increased, reduced and maintained by the electromagnetic on-off valves 8, 9. If the brake fluid used is of a type whose viscosity tends to change widely with temperature, the difference between the target pressure and the actual pressure will widen if the viscosity of the brake fluid becomes extremely high.

In order to solve this problem, the brake system of this invention has two pressure sensors 25, 26 for detecting the master cylinder pressure. The one pressure sensor 25 has a zero-point temperature drift function, while the other sensor 26 has no or a minimum zero-point temperature drift. The brake fluid temperature is estimated based on the output difference at zero-point of the two pressure sensors 25, 26. Based on the thus estimated brake fluid temperature, the viscosity of the brake fluid is estimated. The electromagnetic on-off valves 8, 9 are controlled according to a control mode corresponding to the fluid viscosity.

Figure 9:
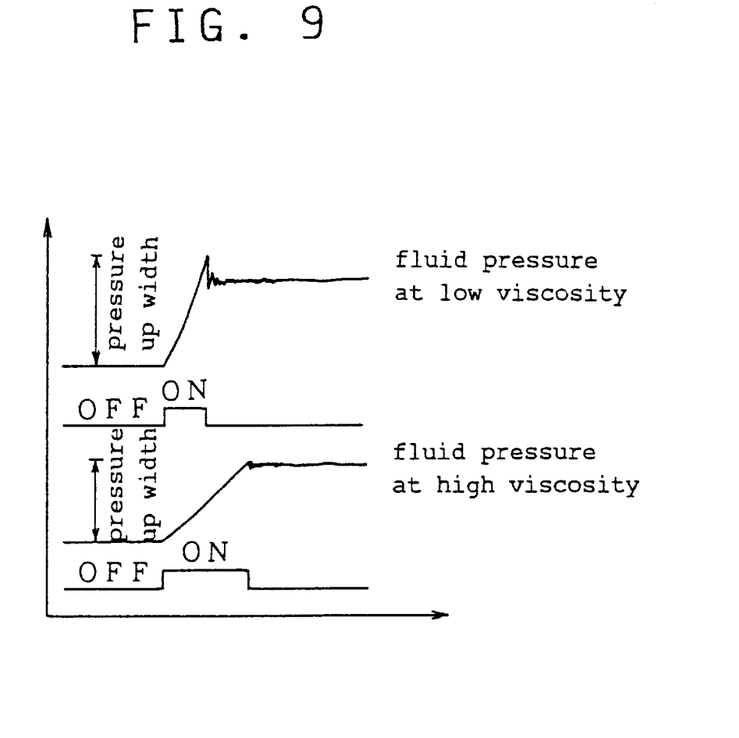
FIG. 9 is a graph showing the relationship between the time during which the electromagnetic on-off valves are open and the pressure range.

According to the control mode, the higher the fluid viscosity, the longer the electromagnetic on-off valves 8, 9 are opened. Thus, when the brake fluid temperature is so low and the fluid viscosity so high as to influence the controlled fluid pressure, the period during which the electromagnetic on-off valves 8, 9 are opened are changed as shown in FIG. 9 such that a required amount of fluid can flow even when the fluid viscosity is extremely high. Thus, fluid pressure can be increased and decreased within substantially the same range as when the fluid viscosity is low.

In the brake system of FIG. 1 in which two pressure sensors are used, zero point is determined based on the output of the pressure sensor having no or a minimum zero-point temperature drift function. In another arrangement in which a brake sensor is provided to determine whether or not the master cylinder pressure is being produced, the zero point can be determined based on a signal from the brake sensor. In this case, a single pressure sensor having a zero-point temperature drift function is sufficient. Any output of the pressure sensor produced while the master cylinder is not producing pressure is subject to a temperature drift. Thus, it is possible to estimate the brake fluid temperature based on the output of the pressure sensor which drifts.

Figure 2:
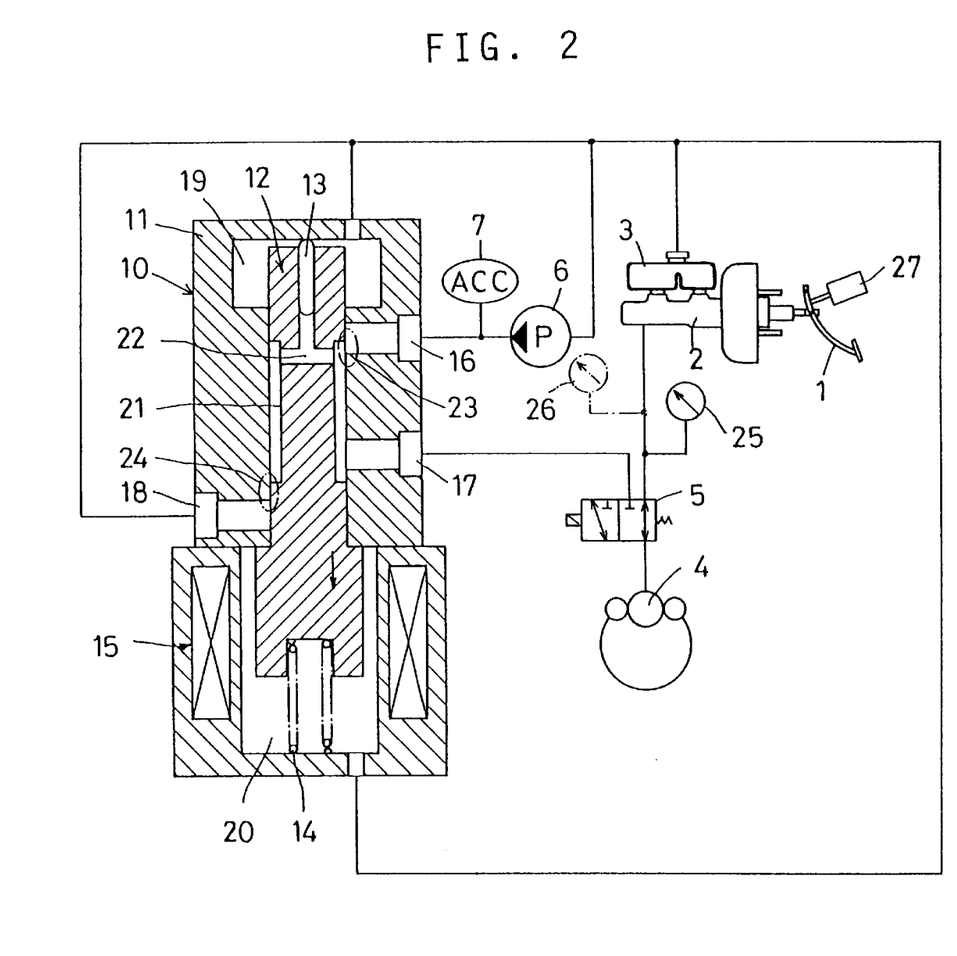
FIG. 2 is a circuit diagram of a brake system constructed by adding means for carrying out the method of this invention to the brake system of FIG. 4.

FIG. 2 shows a system constructed by adding means for carrying out the method of this invention to the brake system of FIG. 4.

In this brake system, an electromagnetic proportional pressure control valve 10 is used to control the fluid pressure in the wheel cylinder 4. The control valve 10 includes a spool 12 having pressure-receiving portions having different sectional areas from each other for receiving the pressure at the second port 17 in opposite directions, and a spool drive means comprising a spring 14 and an electromagnet 15 to which a current controlled by an electronic control unit (not shown) is supplied.

The spool 12 is adapted to move to a point where the driving force by the drive means balances with the thrust by the pressure at the second port. As the spool moves, the state of communication between the first port 16 connected to the fluid pressure source or the third port 18 connected to the reservoir 3 and the second port 17 changes over, and the degrees of opening of the first valve portion 23 for opening and shutting off communication between the first port 16 and the second port 17 and the second valve portions 24 for opening and shutting off communication between the second port 17 and the third port 18 are controlled to values corresponding to the current supplied to the electromagnet 15.

Figure 10:
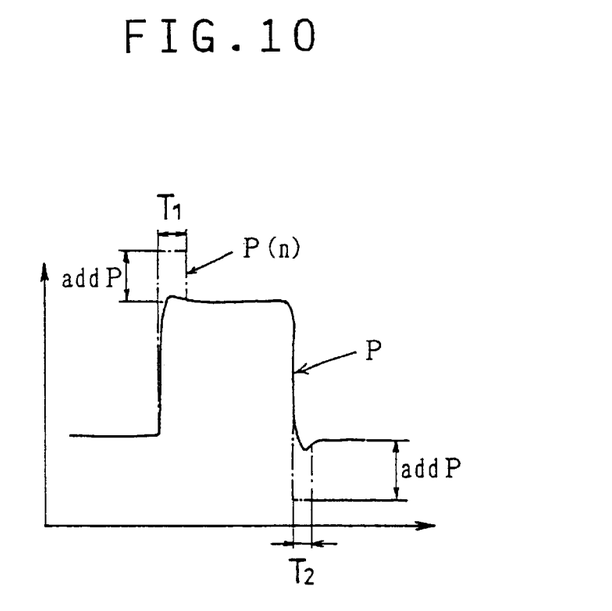
FIG. 10 shows a waveform of the actual pressure controlled by the method of this invention using an electromagnetic proportional pressure control valve.

Thus, if the viscosity of the brake fluid increases excessively with change in temperature, a delay in response will be a problem. To solve this problem, according to the invention, a pressure sensor 25 having a predetermined zero-point temperature drift function and a brake switch 27 are provided. The latter serves to detect that the brake pedal 1 is not depressed and thus the master cylinder is not producing pressure. The brake fluid temperature is estimated based on the drift output of the pressure sensor 25 at this time, and the viscosity of the brake fluid is estimated based on the thus estimated fluid temperature, and the electromagnetic proportional pressure control valve 10 is controlled according to a control mode based on the fluid viscosity. In this control, as shown in FIG. 10, a current supplied to the electromagnet 15 is controlled to carry out overshoot or undershoot control when pressure is increased or decreased, respectively, to a final target pressure equal to the target pressure P(n) plus or minus a predetermined pressure addp, respectively, for time periods T1 or T2.

Thus, by increasing the degrees of opening of the valve portions when the brake fluid temperature is low and its viscosity high, fluid flows quickly, thus preventing any delay in response.

In this method, value addP and time periods T1, T2 are predetermined to optimal values for every temperature range and stored in the ECU for use in the actual control. Time periods during which the electromagnetic on-off valves 8, 9 (FIG. 1) are opened, are also predetermined for every temperature range and stored in a memory table so as to be read for use in the actual control.

Like the brake system of FIG. 1, the brake system of FIG. 2 may be provided with two pressure sensors 25, 26 to detect the brake fluid pressure based on the output difference at zero point of the two sensors.

If two pressure sensors are used to detect the brake fluid pressure, both may have the temperature drift function. In this case, they have to have different output characteristics from each other so that a temperature-dependent output difference is produced.

According to this invention, since the brake fluid temperature is detected based on the outputs of the pressure sensors, no temperature sensor is needed. Thus, from both economical and layout viewpoints, it is possible to advantageously carry out accurate brake fluid pressure control according to the brake fluid temperature.

Pressure is controlled according to the control mode corresponding to the brake fluid viscosity estimated based on the detected brake fluid temperature. This solves the problems encountered when the fluid viscosity is extremely high, namely, change in the range within which pressure can be increased and reduced when electromagnetic on-off valves are used, and a delay in response when an electromagnetic proportional control valve is used. This leads to more stable and reliable vehicle behavior control.

What is claimed is:

1. A method of detecting brake fluid temperature in a brake system, comprising:

detecting a pressure of brake fluid at a first pressure sensor and a second pressure sensor, wherein the first pressure sensor and the second pressure sensor are in contact with the brake fluid in a master cylinder of the brake system and wherein the first pressure sensor has a predetermined zero-point temperature drift function and the second pressure sensor has no or a minimum amount of zero-point temperature drift;

determining a difference in pressure at zero-point between an output of the first pressure sensor and an output of the second pressure sensor; and detecting the brake fluid temperature based on the difference.

2. The method of claim 1, further comprising controlling a brake fluid pressure in the brake system based upon the brake fluid temperature, detected in accordance with claim 1, by estimating a viscosity of the brake fluid based on the detected brake fluid temperature; determining a control mode corresponding to the estimated brake fluid viscosity; controlling the brake fluid pressure supplied by the master cylinder to a wheel cylinder based on the control mode; and producing a braking force based on the controlled brake fluid pressure.

3. A method for controlling brake fluid pressure in a brake system in which the brake fluid temperature in a master cylinder is detected in accordance with claim 1, wherein the master cylinder supplies a brake fluid pressure to a wheel cylinder, the method comprising:

estimating a viscosity of the brake fluid based on the detected temperature of the brake fluid;

determining a control mode by a fluid pressure control unit, wherein the control mode corresponds to the estimated viscosity of the brake fluid;

controlling the brake fluid pressure supplied by the master cylinder to the wheel cylinder based on the control mode; and producing a braking force based on the controlled brake fluid pressure.

4. A method of detecting brake fluid temperature in a brake system, comprising:

detecting a pressure of brake fluid at a pressure sensor, wherein the pressure sensor is in contact with the brake fluid in a master cylinder of the brake system and has a predetermined zero-point temperature drift function;

detecting operation of a brake at a brake switch, wherein the pressure sensor detects no pressure of the brake fluid in the master cylinder when the brake switch detects no operation of the brake; and detecting the brake fluid temperature based on an output of the pressure sensor at the predetermined zero-point when the pressure sensor detects no pressure.

5. The method of claim 4, further comprising controlling a brake fluid pressure in the brake system from the detected brake fluid temperature by estimating a viscosity of the brake fluid based on the detected brake fluid temperature; determining a control mode corresponding to the estimated brake fluid viscosity; controlling the brake fluid pressure supplied by the master cylinder to a wheel cylinder based on the control mode; and producing a braking force based on the controlled brake fluid pressure.

6. A method for controlling brake fluid pressure in a brake system, in which a temperature of brake fluid in a master cylinder is detected in accordance with claim 4, wherein the master cylinder supplies a brake fluid pressure to a wheel cylinder, the method comprising:

estimating a viscosity ofthe brake fluid based on the detected temperature of the brake fluid;

determining a control mode by a fluid pressure control unit, wherein the control mode corresponds to the estimated viscosity of the brake fluid;

controlling the brake fluid pressure supplied by the master cylinder to the wheel cylinder based on the control mode; and producing a braking force based on the controlled brake fluid pressure.

\* \* \* \* \*

UNITED STATES PATENT AND TRADEMARK OFFICE
CERTIFICATE OF CORRECTION

PATENT NO. : 6,203,123 B1
DATED : March 20, 2001
INVENTOR(S) : H. Oyama

Page 1 of 1

It is certified that error appears in the above-identified patent and that said Letters Patent is hereby corrected as shown below:

<u>Column 8,</u>
Line 23, "ofthe" should be -- of the --.

Signed and Sealed this

Eighth Day of January, 2002

Attest:

JAMES E. ROGAN
*Attesting Officer*  *Director of the United States Patent and Trademark Office*